United States Patent [19]

Jordan et al.

[11] Patent Number: 5,798,799
[45] Date of Patent: Aug. 25, 1998

[54] CONTROLLER FOR PROVIDING TIMING SIGNALS FOR VIDEO DATA

[75] Inventors: Norman James Jordan, Anstead; John Michael Archbold, Hampton, both of Australia

[73] Assignee: Australian Research and Design Corporation Pty Ltd, Milton, Australia

[21] Appl. No.: 646,377

[22] PCT Filed: Jul. 25, 1995

[86] PCT No.: PCT/AU95/00448

§ 371 Date: Feb. 25, 1997

§ 102(e) Date: Feb. 25, 1997

[87] PCT Pub. No.: WO96/03836

PCT Pub. Date: Feb. 8, 1996

[30] Foreign Application Priority Data

Jul. 25, 1994 [AU] Australia .................. PM7004

[51] Int. Cl.$^6$ .................................. H04N 7/01
[52] U.S. Cl. ............... 348/552; 348/510; 348/521; 348/458
[58] Field of Search ................... 348/516, 510, 348/441, 521, 552, 458; H04N 7/01

[56] References Cited

U.S. PATENT DOCUMENTS

| | | | |
|---|---|---|---|
| 3,898,377 | 8/1975 | Fairbairn et al. | 348/510 |
| 4,495,595 | 1/1985 | Nakayashiki | 364/900 |
| 4,554,582 | 11/1985 | Wine | 348/510 |
| 4,670,785 | 6/1987 | Medin | 348/510 |
| 5,486,668 | 1/1996 | Shyu et al. | 348/524 |
| 5,526,055 | 6/1996 | Zhang et al. | 348/540 |
| 5,712,688 | 1/1998 | Eglit | 348/510 |

FOREIGN PATENT DOCUMENTS

| | | |
|---|---|---|
| 0484981A2 | 5/1992 | European Pat. Off. . |
| 0507159A1 | 10/1992 | European Pat. Off. . |
| 0588499A2 | 3/1994 | European Pat. Off. . |

*Primary Examiner*—Glenton B. Burgess
*Attorney, Agent, or Firm*—Jacobson, Price, Holman & Stern, PLLC

[57] ABSTRACT

A controller for synchronising video signals for displaying on TV screen. The controller has a horizontal input storage for receiving a horizontal synchronising signal of a first sequence for computer generated image data; a vertical input storage for receiving a vertical synchronising signal of a second sequence for computer generated image data; a first processor for generating horizontal synchronising signals of a third sequence and vertical synchronising signals of a fourth sequence; and a second processing for combining the horizontal synchronising signal of the first sequence and the horizontal synchronising signal of the third sequence to generate a horizontal synchronising signal of a fifth sequence and for combining the vertical synchronising signal of the second sequence with the vertical synchronising signal of the fourth sequence to generate a vertical synchronising signal of a sixth sequence; wherein the horizontal synchronising signal of the fifth sequence and the vertical synchronising signal of the sixth sequence generated by the second processor means are arranged to provide timing sequences for image data generated by a computer whereby the image data can be displayed on a TV screen.

30 Claims, 17 Drawing Sheets

```
chip U403 PALCE16V8

CLK HSYNC VSYNC BLANK HHSYNC HVSYNC PAL PO1 PO0 GND
PO7 CTL12 OEH OEV BLANKTS BLANK CHSYNC CVSYNC NC VCC equations CVSYNC          =        PO1*  HSYNC*  VSYNC
                +        PO1* /HSYNC* /VSYNC
                +       /PO1*  VSYNC
CVSYNC.oe       =        OEV
OEV             =       /PO0
                +       /PO1
OEV.oe          =        VCC
/CHSYNC         =        PO1*  HSYNC  *  VSYNC
                +        PO1* /HHSYNC* /VSYNC
                +       /PO1* /HSYNC
CHSYNC.oe       =        OEH
OEH             =        PO0
                +       /PO1
OEH.oe          =        VCC
BLANK           =        PO7
BLANK.oe        =        PO1* /PO0
BLANKTS         =        PO7
BLANKTS.oe      =        PO1*  PO0
CTL12           =       /PO7
CTL12.oe        =        VCC
```

FIG. 5

CHIP U404 TV Tessellation

PCLK CC0 CC1 CC2 CC3 CC4 CC5 CC6 CC7 Gnd
CC8 CC9 PAL HVSYNC HHSYNC VSYNC HSYNC CCLR RESET Vcc

INTERNAL
hsync1 hsync2 hsync3 hc4 hc3 hc2 hc1

EQUATIONS

```
hsync1   =   /CC9*   CC8*    CC7*   /CC6
         +    CC9*   CC8*   /CC7*    CC6
hsync2   =   /CC9*  /CC8*   /CC7*   /CC6
         +   /CC9*   CC8*    CC7*    CC6
hsync3   =   /CC9*  /CC8*   /CC7*   /CC6 hhsync   =   vsync*  hsync2*  /hc4*  /hc3
         +   vsync*  hsync2*  /hc4*   hc3*  /hc2*  /hc1
         +   vsync* /hsync1*  /hc4*   hc3*  /hc2*   hc1
         +   vsync* /hsync1*  /hc4*   hc3*   hc2
         +   vsync* /hsync1*   hc4*  /hc3*  /hc2
         +   vsync*  hsync2*   hc4*  /hc3*   hc2
         +   vsync*  hsync2*   hc4*   hc3* hc1      =   vsync*  /hc1
hc2      =   vsync*   hc1*  /hc2
         +   vsync*  /hc1*   hc2
hc3      =   vsync*   hc1*   hc2*  /hc3
         +   vsync*  /hc2*   hc3
         +   vsync*  /hc1*   hc3
hc4      =   vsync*   hc1*   hc2*   hc3*  /hc4
         +   vsync*  /hc3*   hc4
         +   vsync*  /hc2*   hc4
         +   vsync*  /hc1*   hc4
```

FIG. 6

| | |
|---|---|
| VCLK | Video Clock |
| CTL12A | Control Signal for SCART I/F |
| TSCART | Input Signal for SCART I/F |
| RESET | Reset (if required) from computer |
| BLANKS | Blanking signal from SCART I/F |
| MO17 | MD17 Configuration signal |
| MO18 | MD18 Configuration signal |
| MO19 | MD19 Configuration signal |
| RMO5 | RMD$\phi$5 Configuration signal |
| RMO7 | RMD$\phi$7 Configuration signal |
| MD$\phi$ | MD$\phi$ Configuration signal |
| MD1 | 1 Configuration signal |
| MD5 | 5 Configuration signal |
| MD7 | 7 Configuration signal |
| MD16 | 16 Configuration signal |
| P$\phi$7 | P$\phi$7 Configuration signal |
| H11JP1 | Mounting hole |
| H31JP1 | Mounting hole |
| CVSYNC.oe | Internal signal for SCART I/F |
| OEV | Internal signal for SCART I/F |
| CHSYNC.oe | Internal signal for SCART I/F |
| OEH | Internal signal for SCART I/F |
| OEH.oe | Internal signal for SCART I/F |
| BLANK | Internal signal for SCART I/F |
| BLANK.oe | Internal signal for SCART I/F |
| CTL12.0e | Internal signal for SCART I/F |
| CTLIZ 1 | ICTLB |
| PCLK | CCONFB |
| PAL | CCONFB |
| BLANKS | Internal signal |
| BLANKTS | ICTLA |
| P$\phi$1 | ISTSB |
| P$\phi\phi$ | ISTSA |
| CC$\phi$ | Counterparts |
| CC1 | Counterparts |
| CC1 | Counterparts |
| CC9 | Counterparts |

FIG. 7

```
                            R       R   R
                            E       E   E
                            S       S   S
              B             E       E   E
              L             R       R   R
              U     V G G G V G V V
              E X X C N N N E N E E
              i o i C D D D D D D
             ┌─────────────────────────────┐
             │ 6 5 4 3 2 1 44 43 42 41 40  │
   GREEN1  7 │                             │ 39  RESERVED
     RED1  8 │                             │ 38  RESERVED
    HSync  9 │                             │ 37  RESERVED
      GND 10 │                             │ 36  RESERVED
    VSync 11 │                             │ 35  VCC
   DotClk 12 │       ITIN501A-20           │ 34  RESERVED
 RESERVED 13 │                             │ 33  RESERVED
 RESERVED 14 │                             │ 32  RESERVED
      VCC 15 │                             │ 31  RESERVED
    Blank 16 │                             │ 30  GND
 RESERVED 17 │                             │ 29  ClkP28
             │ 18 19 20 21 22 23 24 25 26 27 28 │
             └─────────────────────────────┘
              V H C R G V P R G B C
              D D S E N C A E R L 1
                  y S D C L D E U k
                  n E   / o E E 1
                  v R   N   N o 2
                    V   T
                    E   S
                    D   C
```

N.C.     —  Not Connected.
VCC      —  Dedicated power pin, which must be connected to VCC.
GND      —  Dedicated ground pin or unused dedicated input, which must be connected to GND.
RESERVED —  Unused I/O pin, which must be left unconnected.

FIG. 12

Pin Description

| | | | |
|---|---|---|---|
| 1 | Gnd | I | Ground |
| 2 | Gnd | I | Ground |
| 3 | Vcc | I | +5V |
| 4 | Xi | I | Crystal Input |
| 5 | Xo | O | Crystal Output |
| 6 | BlueI | I | Red Input |
| 7 | GreenI | I | Green Input |
| 8 | RedI | I | Blue Input |
| 9 | Hsync | I | Horizontal Sync |
| 10 | Gnd | I | Ground |
| 11 | Vsync | I | Vertical Sync |
| 12 | DotClk | I | Connect to P27 |
| 13 | NC | | |
| 14 | NC | | |
| 15 | Vcc | I | +5v |
| 16 | Blank | O | Blank Output |
| 17 | NC | | |
| 18 | VD | O | Vertical Sync O |
| 19 | HD | O | Horizontal Sync O |
| 20 | Csync | O | Composite Sync O |
| 21 | Field | O | PAL Field |
| 22 | Gnd | I | Ground |
| 23 | Vcc | I | +5v |
| 24 | NC | | |
| 25 | CVSync | O | Alternate Sync O |
| 26 | NC | | |
| 27 | Clk25 | O | 25 Mhz Clock O |
| 28 | Clk12 | O | 12.5 Mhz Clock O |
| 29 | NC | | |
| 30 | GND | I | Ground |
| 31 | NC | | |
| 32 | BlueO | O | Blue Output |
| 33 | GreenO | O | Green Output |
| 34 | RedO | O | Red Output |
| 35 | Vcc | I | +5v |
| 36 | NC | | |
| 37 | Hres | O | Connect to P39 |
| 38 | VRes | O | Connect to P40 |
| 39 | HReset | I | Connect to P37 |
| 40 | VReset | I | Connect to P38 |
| 41 | NC | | |
| 42 | Gnd | I | Ground |
| 43 | SyncClk | I | Connect to P27 |
| 44 | Gnd | I | Ground |

Notes:

| | | | |
|---|---|---|---|
| Vcc | Dedicated power pin. | | |
| Gnd | Dedicated ground pin. | | |
| I | Input | D | Pulldown |
| O | Output | S | Schmidt |
| U | Pullup | T | Tri-State |

NC  Unused I/O pin which MUST be left unconnected.

FIG. 13

CONTROLLER FOR PROVIDING TIMING SIGNALS FOR VIDEO DATA

FIELD OF THE INVENTION

The present invention relates to technology concerned with displaying video data on a TV screen.

BACKGROUND OF THE INVENTION

Video data generated by a computer is displayed on a computer monitor and is specifically formatted for such display.

Because the video data generated by a computer is in a format which is not compatible with the electronics of a TV it is not possible to display video data generated by computer (for instance a VGA video controller) on a TV screen.

Devices which have been developed to overcome this problem receive video data from the computer and typically capture a complete frame, score it in memory and redisplay the information via a composite signal. In its normal capacity a TV receives video data through an RF input, the data is fed to an RF tuner and from there to a decoder which demodulates the video data and converts it to a form which is receivable by the TV screen driver. The video data which is sent to the decoder from the tuner is in a preconfigured format which is compatible with the TV. Because the decoder formats all the received information so that it can be displayed on the TV screen video data from a computer source is processed so that it is in a digitised form which can be interpreted by the TV decoder.

Because of the amount of processing required of the computer generated video signals, it has not been possible to produce a picture of sufficient quality when it is ultimately displayed on a TV screen. In addition to this because there are three types of TV being used throughout the world, these being the NTSC, PAL and SECAM systems, the problem of producing a device that interfaces a computer and TV screen is further compounded.

Because of the cost involved with finding a device which will interface a computer with a TV screen, t has been considered more feasible to display TV video data on a computer monitor rather than the other way around.

The present invention provides an alternative method of interfacing uniquely formatted computer generated video data with a TV screen.

SUMMARY OF THE INVENTION

According to one aspect of the present there is provided a controller for synchronising video signals for display on a TV screen comprising:

a horizontal input storage means for receiving a horizontal synchronising signal of a first sequence for computer generated image data;

a vertical input storage means for receiving a vertical synchronising signal of a second sequence for computer generated image data;

a first processor means for generating horizontal synchronising signals of a third sequence and a vertical synchronising signals of a fourth sequence;

and a second processing means for combining the horizontal synchronising signal of the first sequence and the horizontal synchronising of the third sequence to generate a horizontal synchronising signal of a fifth sequence and for combining the vertical synchronising signal of the second sequence with the vertical synchronising signal of the fourth sequence to generate a vertical synchronising signal of a sixth sequence;

wherein the horizontal synchronising signal of the fifth sequence and the vertical synchronising signal of the sixth sequence generated by the second processor means are arranged to provide timing sequences for image data generated by a computer whereby the image data can be displayed on a TV screen.

According to another aspect of the present invention there is provided a method of synchronising image data for display on a TV screen, the method comprising the steps of receiving a horizontal synchronising signal of a first sequence associated wish computer generated image data receiving a vertical synchronising second sequence associated with the computer generated image data using a first processor means to generate horizontal synchronising signals of a third sequence and vertical synchronising signals of a fourth sequence using a second processor means for combining the horizontal synchronising signal of the first sequence and the horizontal synchronising signal of the third sequence and for combining the vertical synchronising signal of the second sequence with the vertical synchronising signal of the fourth sequence to generate horizontal synchronising signals of a fifth sequence and vertical synchronising signals of a sixth sequence respectively and outputting the horizontal synchronising signals of the fifth sequence and vertical synchronising signals of the sixth sequence to provide timing sequences for computer generated image data whereby the image data can be displayed on an electronic display.

According to a further aspect of the present invention a system for interfacing a VGA controller and a TV screen, the system comprising an interface unit which is arranged to have its inputs connected with horizontal and vertical synchronising signals generated by the VGA controller and image data generated by the VGA controller, and its outputs connected to the driver of a TV screen, whereby in use image data transmitted by the VGA controller to the interface unit is arranged to be reformatted and synchronized to the timing requirements of the TV screen driver with which the interface unit is connected, whereby image data transmitted by the VGA controller can be displayed on a TV screen.

According to yet another aspect of the present invention a controller is provided for synchronising video signals for display on a TV screen, the controller comprising a first input for receiving a horizontal synchronising signal associated with a video signal, a second input for receiving a vertical synchronising signal associated with the video signal and a processor for receiving and processing the horizontal and vertical synchronising signals from the first and second inputs and for producing a combined synchronising signal for output to a driver of a TV.

Preferably the horizontal synchronising signal and vertical synchronising signal are received from a computer VGA.

Preferably the controller is an interface unit which is arranged to interconnect a computer and TV screen.

The interface unit may comprise an internal clock which is arranged to be combined with the vertical and horizontal synchronising signals in the processor to produce the combined synchronized signal.

The combined synchronising signal may be a tessellated signal.

The interface unit preferably comprises a third input for receipt of a clock signal to be combined with the horizontal and vertical synchronising signals to produce the combined synchronising signal.

Preferably the controller comprises a fourth, fifth and sixth input for red, green and blue video signals and second, third and fourth outputs for outputting modified red, green and blue video signals which are in a form suitable for receipt by a TV driver.

The controller preferably comprises an amplifier for varying the levels of the red, green and blue video signals received at the fourth, fifth and sixth inputs.

The controller may comprise an impedance matching and buffering means for the input red, green and blue video signals received at its fourth, fifth and sixth inputs.

The impedance matching and buffering means may comprise three inputs, one for each colour signal received at the fourth, fifth and sixth inputs.

Preferably each impedance matching and buffering means input is connected to the base of a transistor whose emitter is connected with a respective one of the second, third and fourth outputs of the controller.

The controller preferably comprises a TV mode selector for inputting to the processor a signal indicative of the mode of conversion for the combined synchronising signal.

The TV mode selector preferably inputs a signal to the processor to indicate which type of TV (PAL, NTSC or SECAM) the output is to be connected to.

The controller may receive horizontal and vertical synchronising signals from a VGA controller.

The TV mode selector may input a signal to the processor which indicates the mode of conversion for combining the horizontal and vertical synchronising The TV mode selector preferably comprises an input for receiving an external signal representing the mode of conversion of the TV with which the controller is to be connected The controller preferably comprises a status indicator for indicating if a TV is attached to the controller and if a VGA monitor is connected to the controller.

The status indicator may comprise a first input which is arranged to receive a signal from a TV to indicate when the controller is connected to the TV.

Preferably the status indicator comprises a second input which is arranged to receive a signal from a VGA monitor to indicate when the controller is connected to the VGA monitor.

The controller preferably comprises a display indicator for providing a signal to the processor for indicating whether computer data is to be displayed on a TV screen or whether TV data is to be displayed on a TV screen or whether a combination of data from both the computer and TV is to be displayed on the TV screen.

Preferably the controller comprises a translation means for converting input signals from TTL logic level to 12 volts control level.

Preferably the processor comprises a binary counter which is arranged to receive the clock signal and divide it to provide timing signals for the horizontal synchronising signal and vertical synchronising signal to be combined.

Preferably the binary counter is arranged to output signals representing the duration and period of pulses of the horizontal synchronising signal during a pulse period of the vertical synchronising signal.

Alternatively the binary counter is arranged to output signals representing the duration and period of pulses of the vertical synchronising signal during a pulse period of the horizontal synchronising signal.

The output signals representing the synchronising duration and period of the pulses of the horizontal or vertical synchronising signals are preferably controlled by the mode selector which is arranged to feed a signal to the processor representative of the mode of conversion required for the controller (PAL/NTSC/SECAM) and interlaced operation.

The binary counter preferably outputs signals which are arranged to be input to a PAL which is arranged to combine the horizontal synchronising signal and vertical synchronising signal received from the first and second inputs with the binary counter generated horizontal synchronising signal and vertical synchronising signal to produce a tessellated combined horizontal and vertical synchronising signal for output by the processor.

The duration and period of the horizontal and vertical synchronising signals are preferably determined by monitoring the type of TV system with which the controller is to be used.

It is preferred that the horizontal synchronising signal produced from the binary counter is set at 640 dots or 800 dots and the vertical synchronising signal produced from the binary counter is set an 240 lines or 200 lines in non-interlaced mode or 480 lines or 400 lines in non-interlaced mode.

According to another aspect of the present invention a TV is provided comprising an RF input, a tuner, a decoder, a driver circuit and a TV screen wherein the components are connected together to receive an RF input signal and display this on the TV screen, the driver having input ports for receiving a combined synchronising signal and a blue, green and red video signal directly from an externally connected interface unit, whereby the TV can display video data from the interface unit or video data received through the tuner.

According to another aspect of the present invention there is provided a system for interfacing a VGA controller and a TV screen, the system comprising an interface unit which is arranged to have its inputs connected with a VGA controller and its outputs connected to the driver of a TV screen whereby in use video data transmitted by the VGA controller to the interface unit is arranged to be synchronized to the timing requirements of the TV screen driver with which the interface unit is connected whereby video data transmitted by the VGA controller can be displayed on a TV screen.

Preferably the VGA controller transmits a plurality of signals to the interface unit. These signals including a horizontal synchronisation signal, a vertical synchronisation signal, an analog red signal, an analog green signal and an analog blue signal.

Preferably the plurality of input signals are processed by the interface unit to produce a composite synchronisation signal, an amplified red signal, an amplified green signal and an amplified blue signal.

Preferably the interface unit is arranged to receive a signal from the TV indicating the mode or conversion of the TV (either PAL/NTSC or SECAM) and whether interlaced operation is required. optionally the mode of conversion signal is internally generated from a mode selector means.

Preferably the VGA controller transmits a dot clock signal to the interface unit and the interface unit combines the dot clock signal with the synchronisation signals to produce the composite synchronisation signal.

According to another embodiment of the present invention a TV is provided comprising an RF input, a tuner, a decoder, a driver, a TV screen and an interface unit according to any one of the embodiments previously described.

According to another aspect of the present invention a VGA controller is provided comprising an interface unit according to anyone of the previously described embodiments.

According to another aspect of the present invention the interface unit comprises a single integrated circuit chip with internal circuitry which is selected to receive vertical and horizontal synchronisation signals from a computer and produce a composite horizontal and vertical synchronisation signal for transmission to a TV driver whereby video data produced by the VGA controller can be displayed on the TV screen.

Preferably the combined synchronisation signal produced by the interface unit is a simplified tessellated signal if the number of horizontal pulses per vertical pulse is less than 4.

The processor may be arranged to produce an even field combined synchronisation signal and an odd field combined synchronisation field.

Preferably the combined synchronisation signal produced by the processor comprises even field and odd field signal components.

BRIEF DESCRIPTION OF THE DRAWINGS

A preferred embodiment of the present invention will now be described by way of example only with reference to the accompanying drawings in which:

FIG. 5 shows a first set of equations for signals which are either input or output to the PAL;.

FIG. 6 shows a set of equations for internal signals of the PAL;

FIG. 7 shows a legend for the various signals shown in FIGS. 4A to 4F;

FIG. 12 shows a PAL according to the second embodiment; and

FIG. 13 shows a pin description of the PAL shown in FIG. 12

DESCRIPTION OF THE PREFERRED EMBODIMENTS

Figure 1:
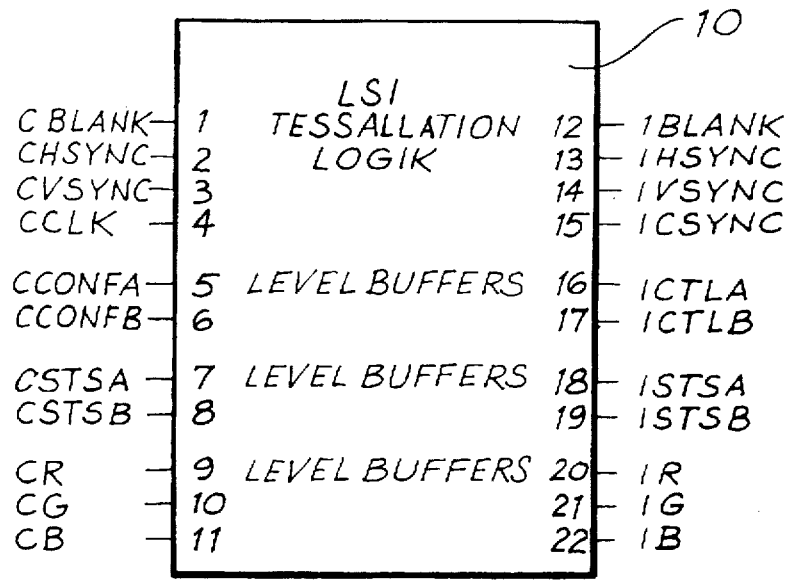
FIG. 1 shows a block diagram of an interface unit according to a first Embodiments of the present invention.

FIG. 1 shows a block diagram of the interface unit and the preferred input and output signals. A more detailed analysis of the componentry and processing performed in the interface unit is provided later in the description with reference to FIGS. 4A to 4C.

The interface unit 10 is shown having 11 inputs from terminal 1 to 11 and 11 outputs from terminals 12 to 22. The input terminals are connected with corresponding terminals of a computer VGA controller.

In its simplest form the interface unit receives analog red, green and blue signals (CR, CG and CB) at terminals 9, 10 and 11. Horizontal synchronisation and vertical synchronisations (CHSYNC and CVSYNC) are received at terminals 7 and S. Additional signals are received to allow increased functionality and these include a blanking signal at terminal 1 (CBLANK), a dot clock signal at terminal 4 (CCLK), computer configuration signals CCOMFA and CCOMFB at terminals 5 and 6 provide information on the mode of conversion (PAL/NTSC/SECAM) required so the timings signal sent to a TV driver are compatible with the TV and additional signals CSTSA and CSTSB at terminals 7 and 9 provide status information such as whether the TV is connected to the interface unit and whether the computer is connected to the interface unit.

The minimum set of signals required to drive the driver of the TV are the composite synchronisation signal (ICSYNC) and the video signals IR, IG and IB which are output at terminals 15, 20, 21 and 22 respectively. The other signals output by the interface unit provide additional functionality such as blanking of images on the TV screen (IBLANK) from terminal 12, control of TV operation such as whether an RF generated image is to appear on the TV or whether the computer generated image is to appear on the TV (ICTLA and ICTLB) at terminals 16 and 17 respectively and information on the status of the TV such as the type of display attached and the mode of operation required are fed back to the interface unit through terminals 18 and 19 as signals ISTSA and ISTSB. Signals IHSYNC and IVSYNC provided at terminals 13 and 14 are optional outputs available for diagnostic purposes.

Unlike prior art devices which have attempted to solve the problem of interfacing a computer VGA generated signal with a television screen, the present invention does not operate by capturing a complete frame of video data storing it and redisplaying it via a composite signal which can be processed by the TV decoder. Instead, the interface unit of the present invention receives the video and timing data from the VGA controller and produces the correct signals and timing to allow the information to be introduced within the television circuitry thus eliminating the requirement for storage and conversion to a composite signal.

Because the interface unit produces red, green and blue signals and timing information which matches that of the TV driver, signals containing this information can be led directly to the TV driver instead of the TV decoder, previously this was not thought of.

Throughout the world there are three main types of TV system. These are the PAL, SECAM and NTSC systems. Each of these systems are distinguished by the duration and period of horizontal and vertical synchronisation signals required to form an image on the TV screen. The interface unit man be programmed to receive information from a TV which indicates which type of system the TV operates on and the interface unit can then use this information to produce the correct timing sequences for the horizontal and vertical synchronisation signals which are associated with the video data to be displayed from the computer source. The interface unit as described later consists of a programmable logic device equivalent to the altera EPM 7064LC44 and contains internal latches, counters and logic elements sufficient to implement the conversion of the input signals and their associated timing to the output signals with their modified timing.

According to the preferred embodiment the interface unit consists of a PAL device No. EPM5016PC-15T, the supplier being the Altera Corporation.

In addition to this discrete components are used to convert the level of the logic signals to the required interface level. Discrete components are used to terminate and to buffer the computer generated RGB signals to the levels required by the TV driver. It is possible for signals to be transmitted between the computer and TV through direct connection using wires soldered into the various components or by indirect connection using a plug and socket arrangement.

In contrast to the methods adopted by previous interface units the present invention seeks to present video data from a computer source in a format which is directly compatible with a TV driver. In previous systems the video data produced by a computer is not converted to a form which is directly compatible with a TV driver. Instead the video data is processed and whatever is left of the data after processing it into a form which can be received by the TV decoder is then displayed on the TV screen without having any regard to the format of video data which the screen is specifically designed to display.

For a typical TV a video image is produced from a composite of horizontal and vertical signals which form a matrix of 640 dots in the horizontal resolution and 240 lines in the vertical resolution (for PAL, SECAM) and 200 lines in NTSC. This resolution is doubled to 480 lines in PAL, SECAM and 400 lines in NTSC when interlaced mode is selected.

Figure 3A:
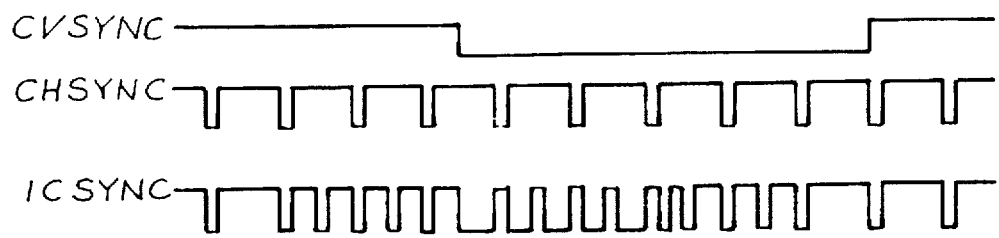
FIG. 3A shows the even field of the signal as generated by the interface unit.
Figure 3B:
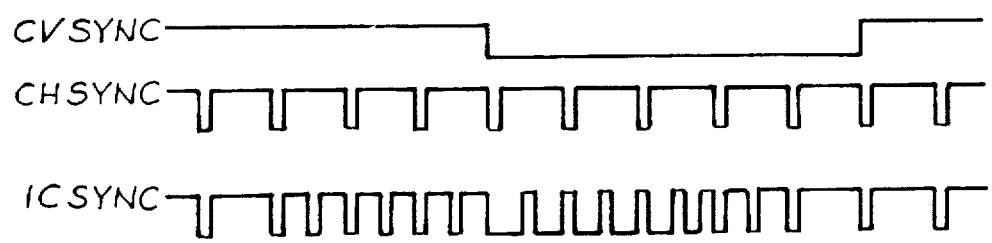
FIG. 3B shows the odd field of the signal as generated by the interface unit.
Figure 3C:
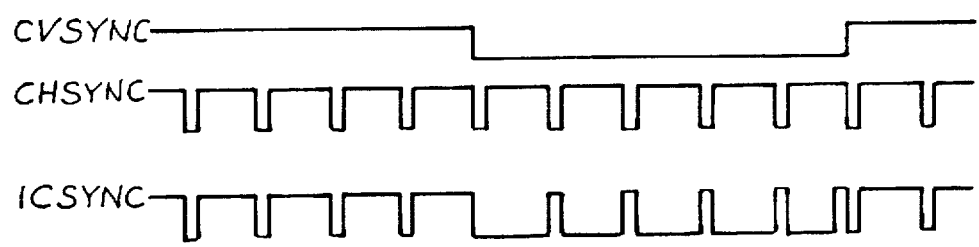
FIG. 3C shows the simplified signal as generated by the interface unit.

It follows that the interface unit having received the video data and timing signals from the VGA controller must convert this information into a form receivable by the TV driver, thus the CVSYNC and CHSYNC are used to generate the correct tessellated ICSYNC signal required for stable operation of the TV. For more tolerant TV sets the tessellation can be simplified if the number of horizontal pulses per vertical pulse is less than 4. Thus referring to FIGS. 3A to 3C, 3A shows the even field of the signal generated by the interface, FIG. 33 shows the odd field of the signal as generated by the interface unit and FIG. 3C shows the simplified signal generated by the interface unit. The theory behind producing odd and even fields to produce the final video image on a TV screen is well understood by a person skilled in the art and a more detailed explanation can be found in a book by G. Hutson and entitled Colour Television Theory ISBN 00770942595, published by McGraw Hill.

The timing for the ICSYNC high period, ICSYNC low period and ICSYNC duration are generated by logic combination of the CVSYNC and CHSYNC signals. Either an internally generated clock or externally supplied CCLX provides the reference timing.

The IR, IG, Is signals are terminated and buffered using transistors configured as emitter followers. The levels of the CR, CG, CB signals are programmed in the VGA controllers digital to analog converter chip (DAC). This ensures correct voltage levels. The palette DAC levels are used to correctly match the colour to any variations in the TV.

Figure 2:
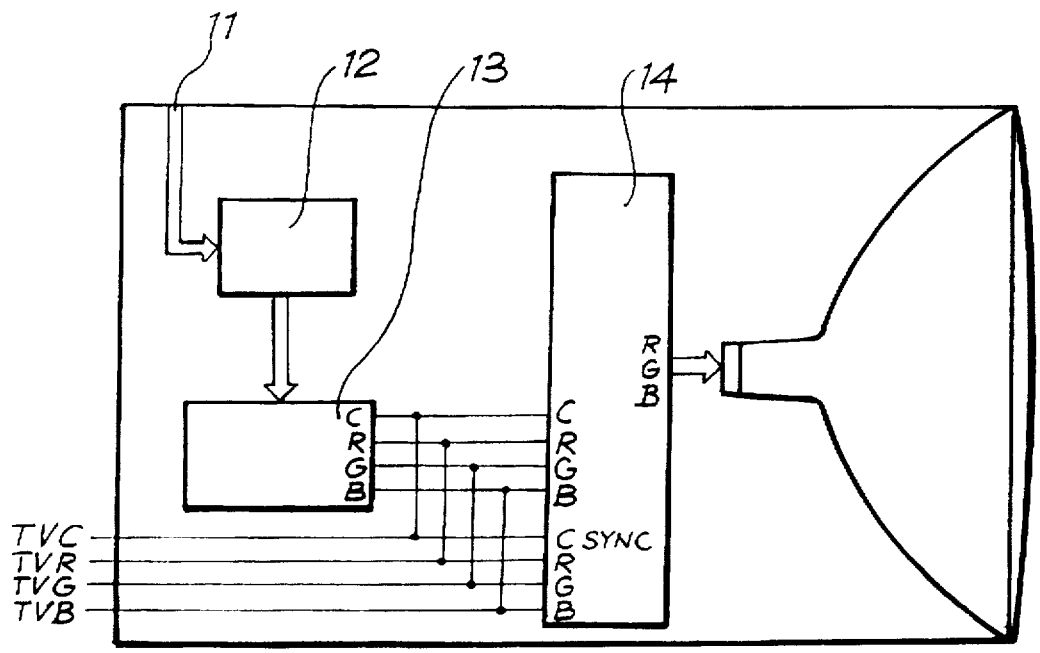
FIG. 2 shows a block diagram of a TV according to a first embodiment of the present invention.

As shown in FIG. 2 a TV according to the preferred embodiment comprises an RF input 11 connected to a tuner 12 which in turn is connected to a decoder 13. The decoder is connected to a driver 14 and FIG. 2 shows the red, green, blue and clock signals as represented by the letters R. G. B and C respectively. The CRGB terminals of the driver 14 are also connected directly to input terminals TVC, TVR, TVG and TVB respectively. These terminals are arranged to be connected to corresponding terminals 15, 20, 21 and 22 of the interface unit.

Although not shown the TV may also be provided with connected terminals for connection with terminals 12, 13, 14, 16, 17, is and 19 of the interface unit and the TV is arranged to have circuitry to process the signals output or input at these terminals of the interface unit.

Figure 4A:
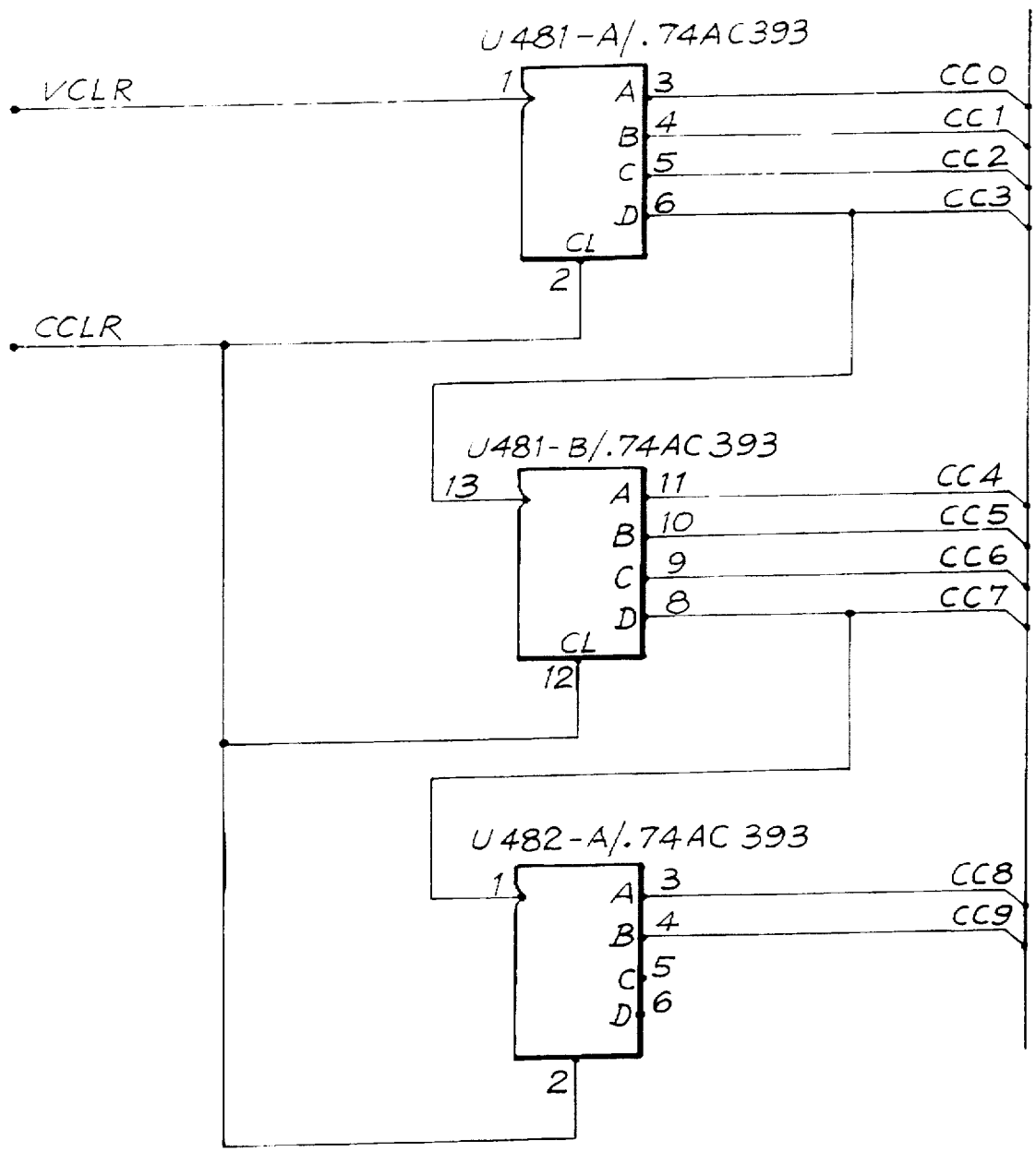
FIG. 4A shows a binary counter according to the first embodiment.
Figure 4B:
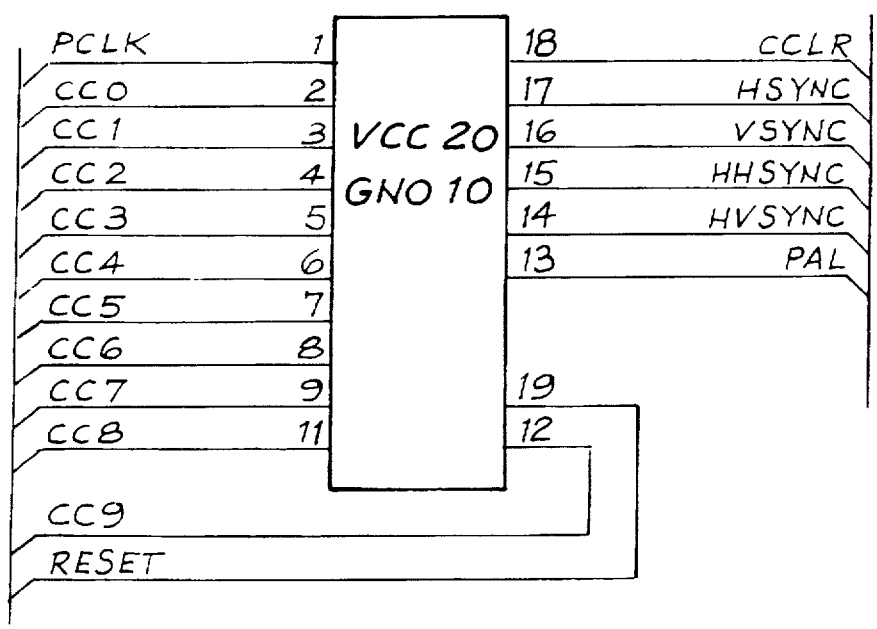
FIG. 4B shows a first part of PAL according Lo the first embodiment.
Figure 4C:
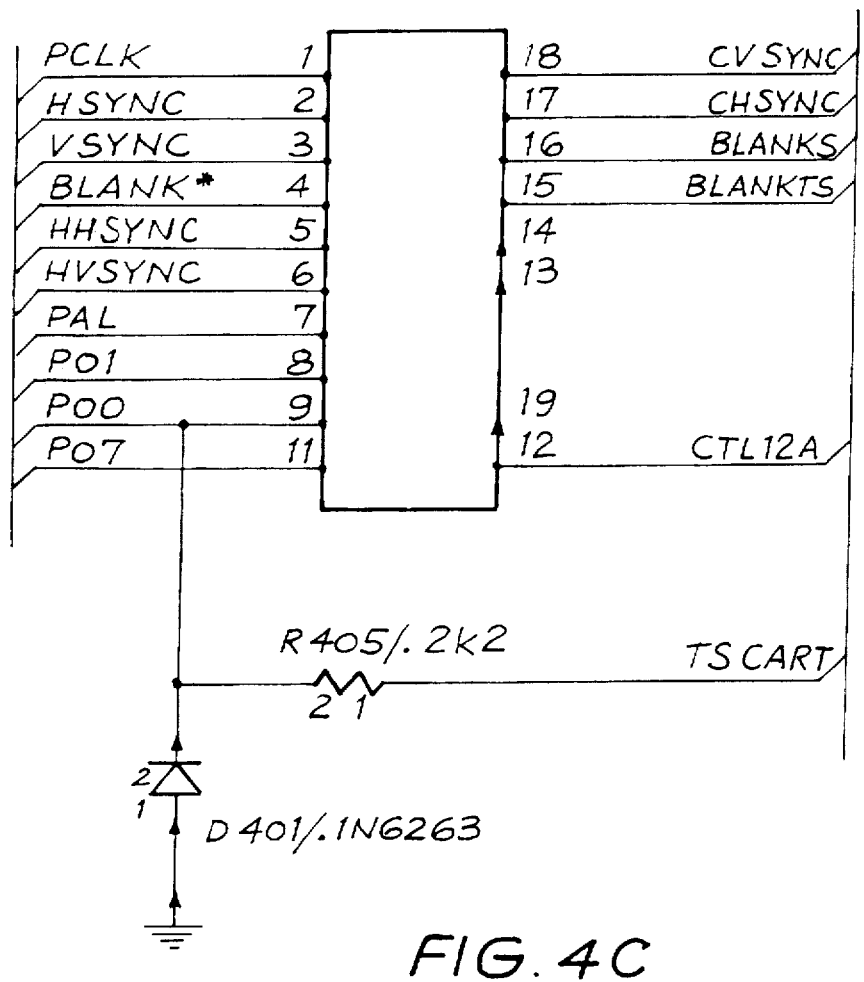
FIG. 4C shows a second part of a PAL according to the first embodiment.
Figure 4D:
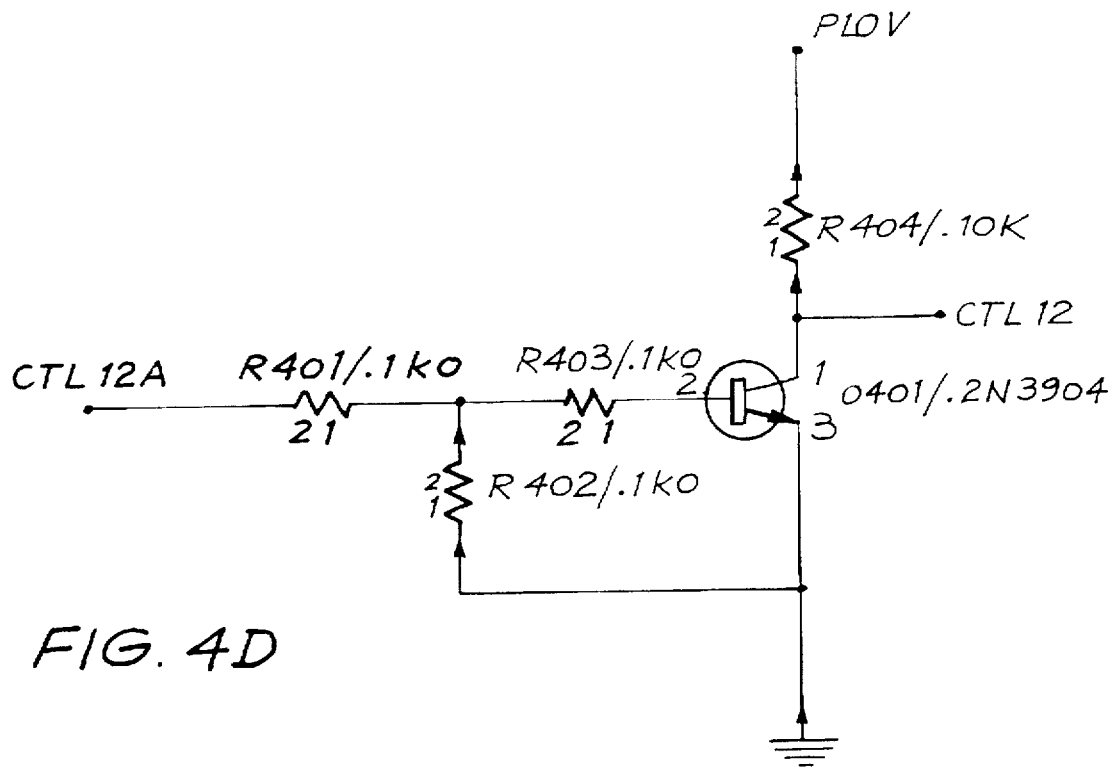
FIG. 4D shows a control circuit according to the first embodiment.

Referring to FIG. 4A a twelve stage binary counter is shown having the VCLK signal and CCLK signal as inputs to provide input timing signals CC to CC9 to the PAL U404. The binary counter is represented by IC's U401--A, U401-B and U402-A. The PAL uses the counter outputs CC to CC9 to generate the duration and period of the horizontal SYNC pulse HSYNC during the vertical SYNC period VSYNC. The SYNC period and duration are controlled by the input configuration lines PAL and PCLK to match the TV system values associated with either PAL, SECAM or NTSC.

The PAL outputs signals HSYNC, VSYNC, SYNC and HVSYNC are sent to the PAL V403. This logic device combines the computer generated HSYNC and VSYNC signals and the device generated HHSYNC and HVSYNC signals to produce the correctly tessellated IVSYNC and IHSYNC signals required by the TV. The timings required for these signals are shown in FIGS. 3A to 3C.

Figure 4F:
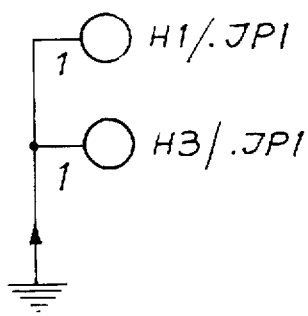
FIG. 4F shows mounting holes which are connected to a ground terminal.
Figure 4E:
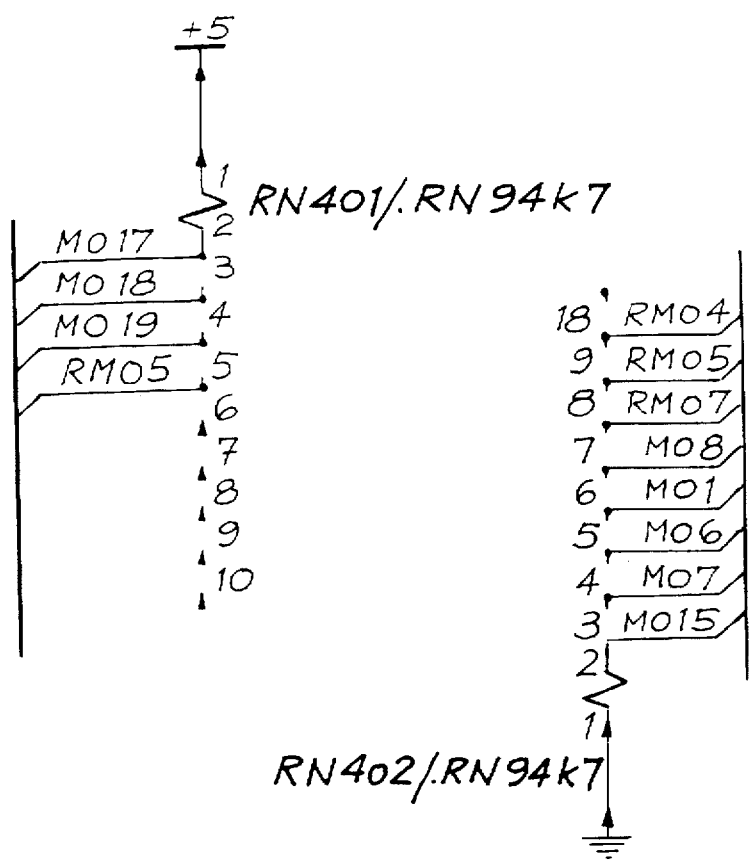
FIG. 4E shows terminals of the PAL which are connected to 5 volts and ground respectively.

FIG. 4E shows the circuitry required to obtain a control signal CTL12 from and input signal CTL12A, while FIGS. 4E and 4F show the configuration terminal signals which are connected to plus 5 volts and ground respectively. FIG. 4F shows the mounting hole terminals which are connected to ground.

FIG. 5 and 6 show the internal equations of the PAL which are required in order to obtain the various output signals. In FIG. 6 SYNC actually corresponds to HHSYNC shown in FIG. 5.

Although not shown in any of the Figures the red, blue ad green signals which are received by the interface unit from the VGA controller each have internal circuitry which consists of a transistor Q402 with its collector connected to a five volt power supply and its emitter connected to ground through a 75 ohm 1% resistor. The output is taken from the emitter and the input which is connected to the base is also connected to ground through a 75 ohm 1% resistor. Typically the transistor is a 2N3904NPN transistor.

Figure 11:
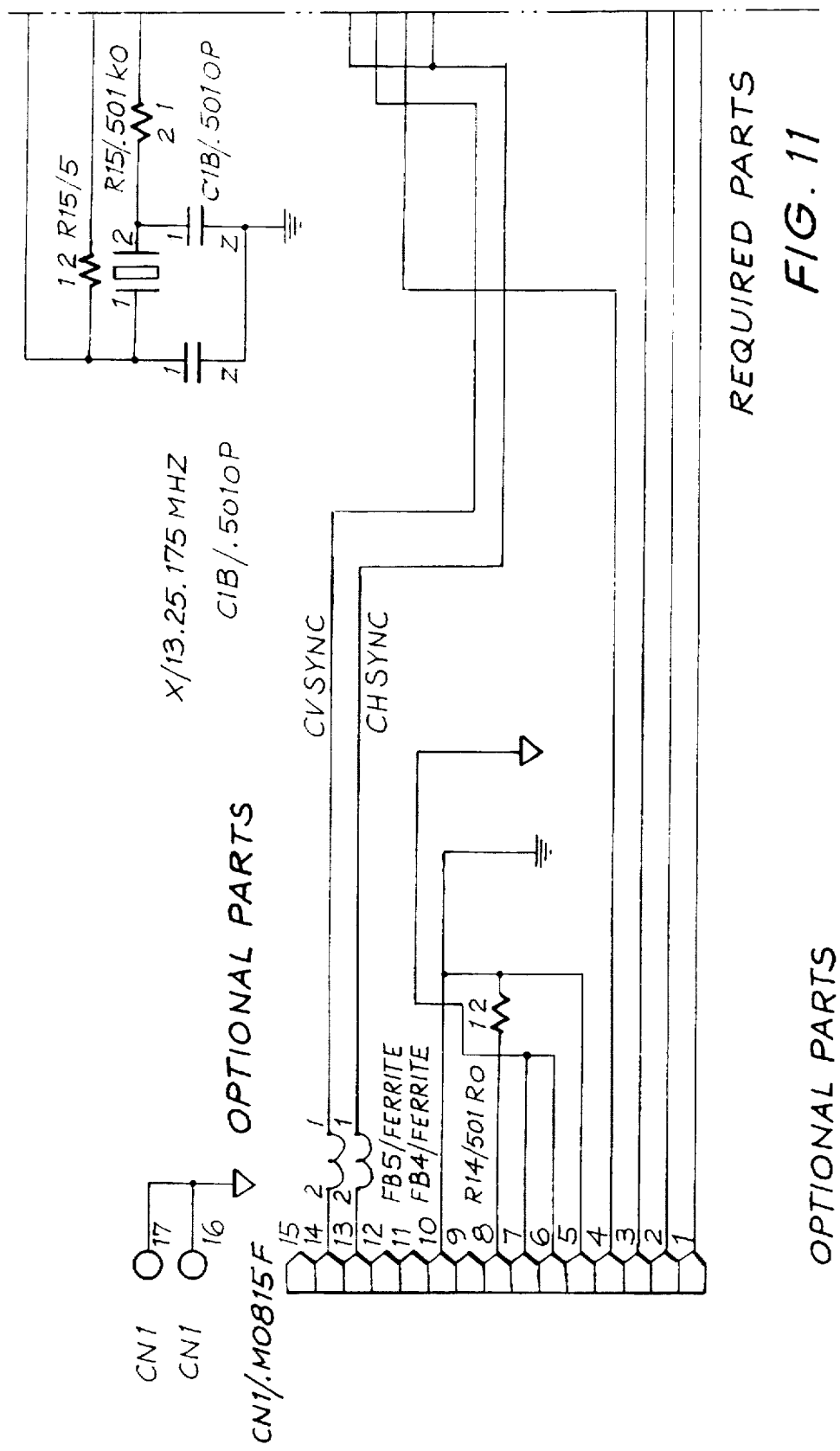
FIG. 11. shows a second embodiment of a circuit diagram of the interface unit.
Figure 11:
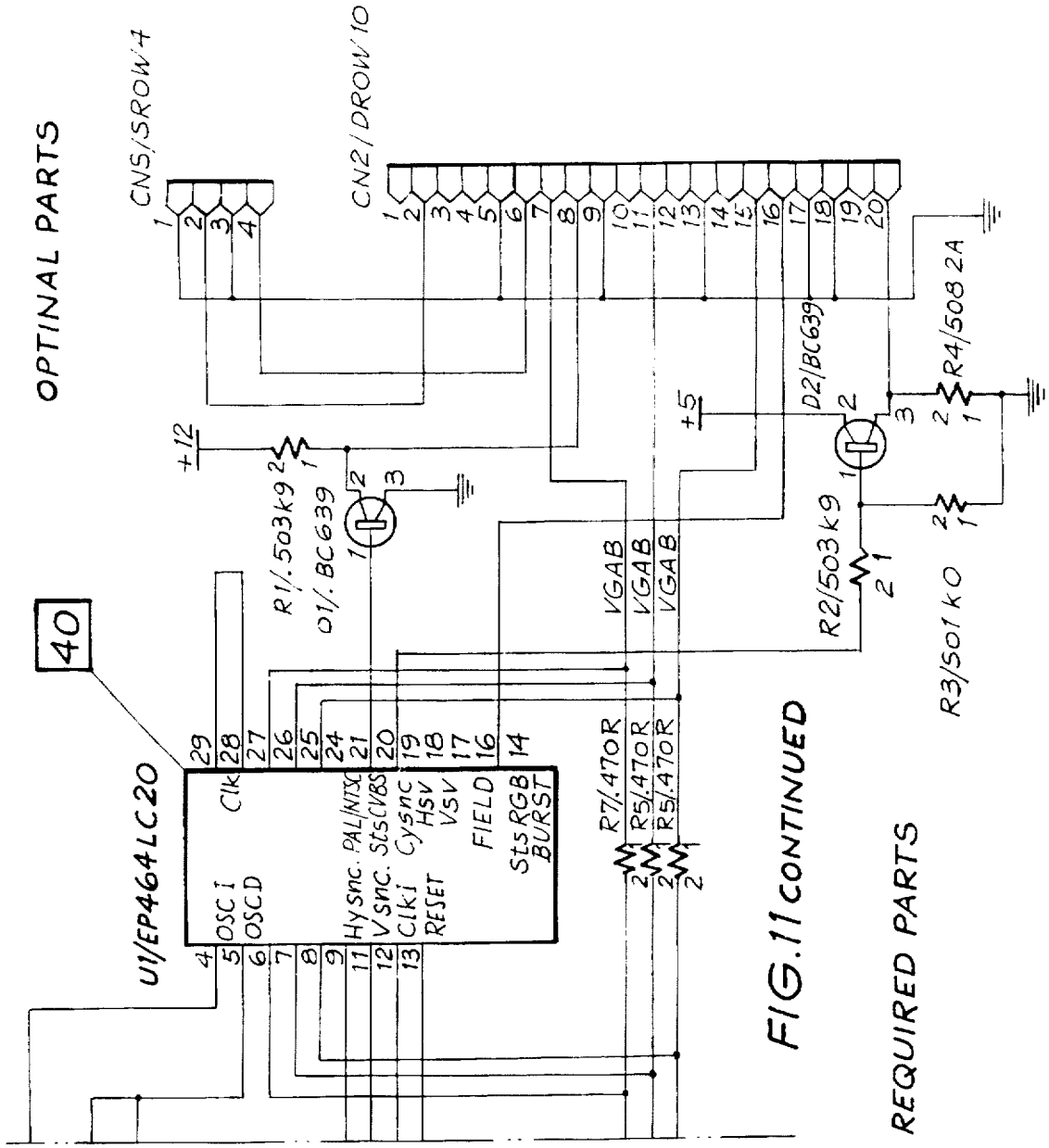

According to another embodiment of the present invention the interface unit is implemented using a circuit diagram as shown in FIG. 11. No description is given of the specifics of this circuit diagram as a person skilled in the art would understand how to make an interface unit having the componentry and circuit layout shown in FIG. 11. The PAL 40 which is used in the circuit diagram in FIG. 11 is shown in more detail in FIG. 12. FIG. 13 shows a pin description for the PAL shown in FIG. 12.

According to a further embodiment of the present inversion the interface unit 10 uses driver software, a horizontal image modulation algorithm, a vertical image modulation algorithm, post processing and the VGA timing previously described.

The algorithms used by the interface unit 10 preferably are designed for decision criteria, decision determination, image processing, region processing and post processing.

The image data received from the VGA controller according to the preferred embodiment consists of red, green and blue signals. This image data as received is already formatted so that it can be displayed on a VGA controller display. However, reformatting is required so that it can be displayed on a TV screen. Accordingly software is required for pre-processing and post processing odd and even frame image data of the VGA type images using an intensity modulation algorithm in the horizontal scan direction. The specific algorithm is dynamically determined by a second algorithm which analyses the vertical image intensity changes.

The horizontal image modulation algorithm (HIMA) can vary from a single representation of the initial image to a fully modulated colour representation of the initial image.

The selection the HIMA is determined by the vertical intensity modulation algorithm (VIMA) which inspects the vertical image intensity changes between adjacent image data in subsequent odd and even lines.

The software algorithm modifies the normal operation of the VGA controller device to provide timing signals consistent with those required by a television or other electronic display medium.

In this embodiment the HIM is determined by a two-dimensional analysis of the original video data with the key parameters being:

i. Width of image;
ii. Height of image;
iii. Colour of transition in image; and
iv. Colour of image.

The VIMA is determined by a one-dimensional analysis of the original video data within the key parameters being:

i. The number of consecutive lines in odd and even frame with similar colour and;
ii. The colour transitions in consecutive lines. Ideally the HIMA and the VIMA consist of one or more the following image modulation techniques:
 i. No change;
 ii. Change to colour using CLUT (colour look up table) or calculation or both;
 iii. Blend consecutive horizontal data; and
 iv. Gradient the colour of the image.

As previously described the interface unit must De capable of formatting image data for different types of electronic display devices such as those used for PAL TV's, SEMA TVis or NTSC TV's. Accordingly the driver software must select the correct screen size based either on an automated feedback system from the TV or predetermined optional mode selection options an the interface unit.

The original video image data may be recovered by a post processing routine which restores the original if required. It is noted that this requirement usually results from an image transition.

Figure 8:
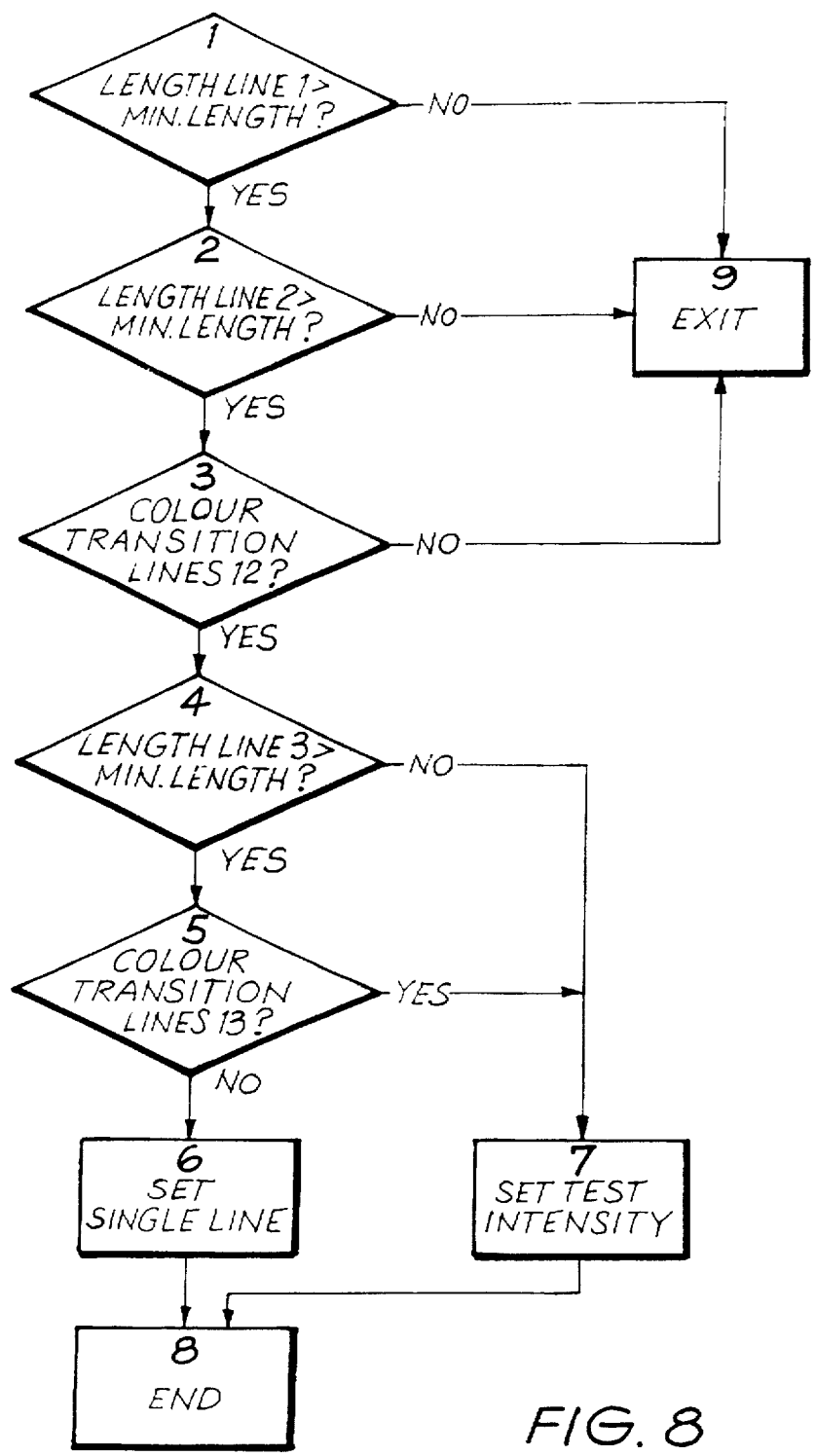
FIG. 8 shows a horizontal image modulation algorithm flowchart associated with software for the interface unit according to a first embodiment.
Figure 9:
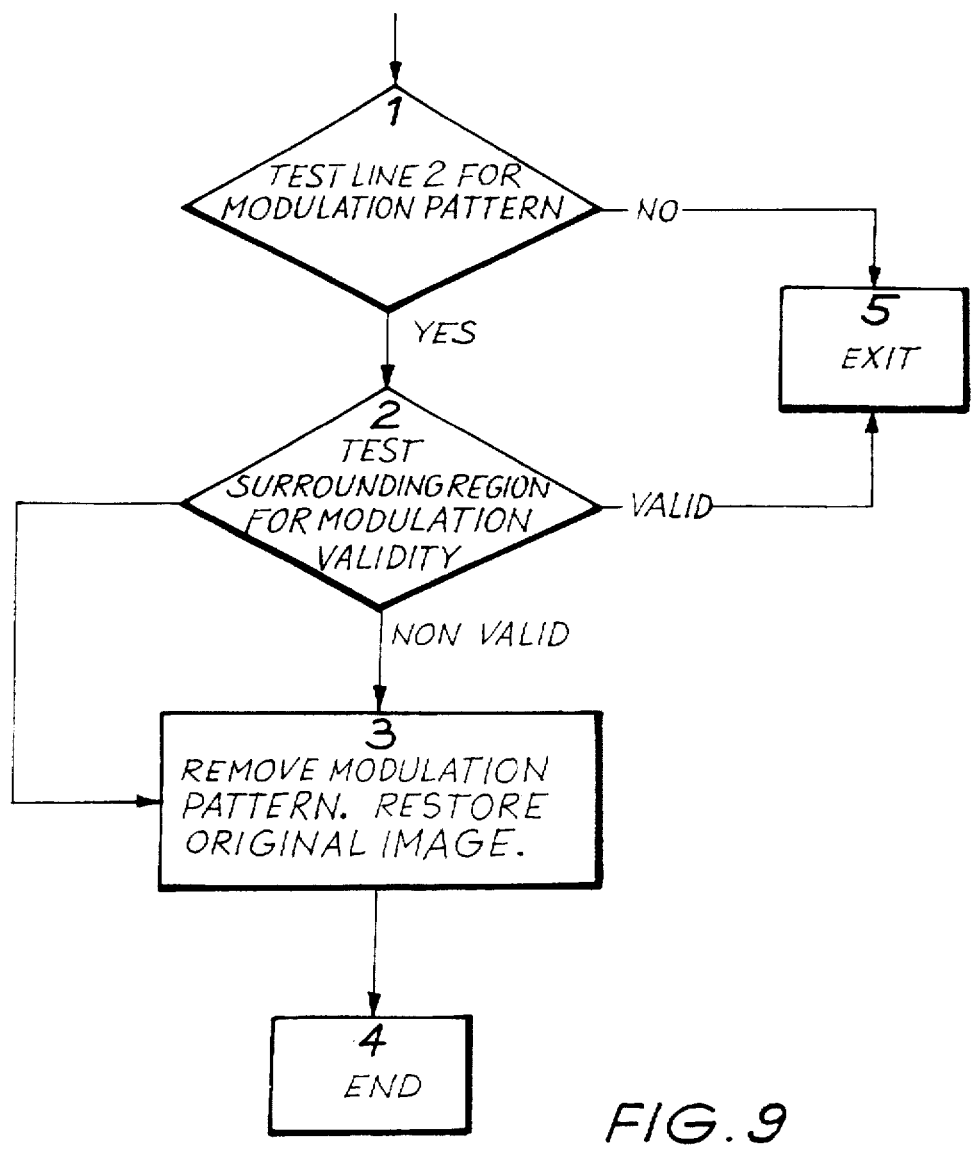
FIG. 9 shows a vertical image modulation algorithm flow chart for the software.
Figure 10:
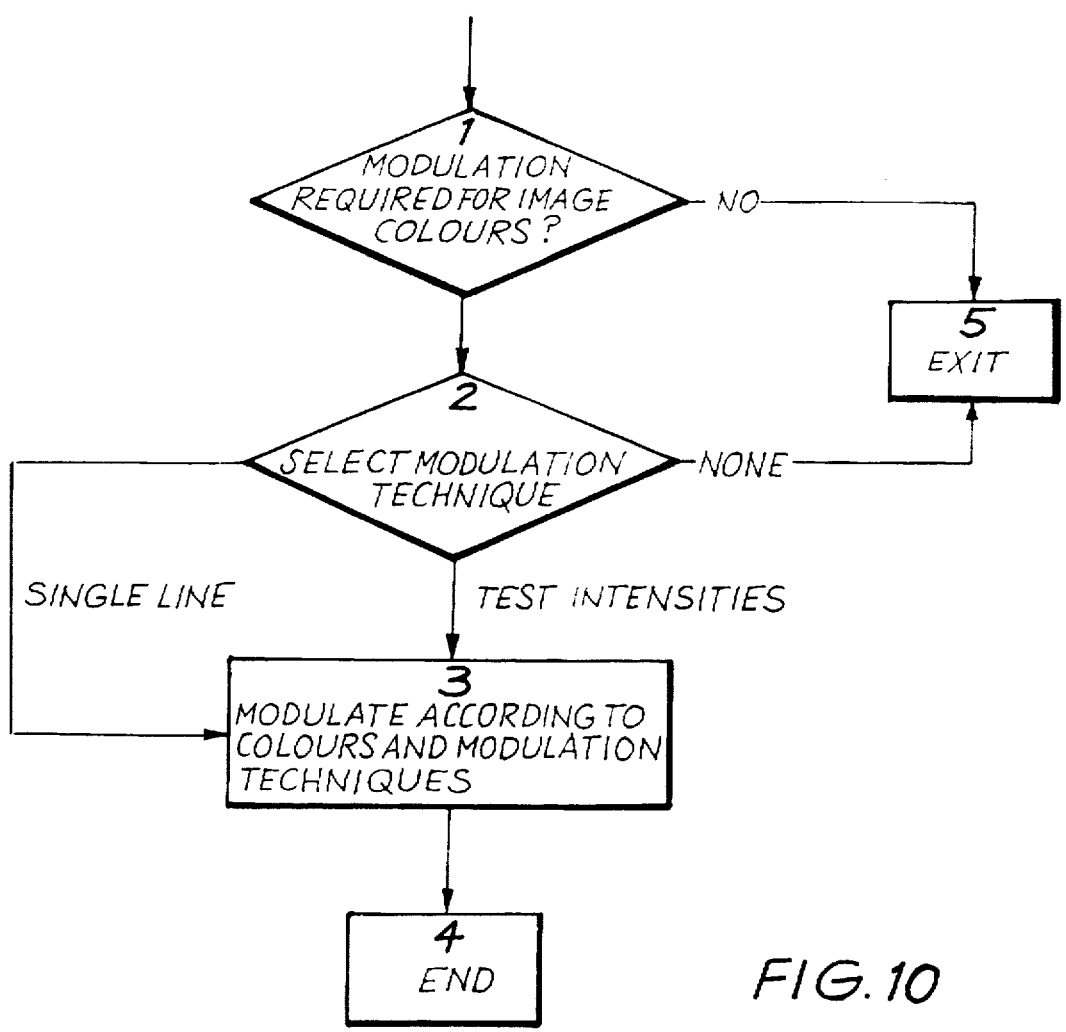
FIG. 10 shows a post processing algorithm flow chart for the software.

An example of a HIMA flowchart and a VI flowchart are given in FIGS. 8 and 9. An example of the post processing algorithm flowchart is given in FIG. 10.

According to one embodiment of the invention the hardware consists of:

VGA to TV synchronisation;
aucodetect input vertical and horizontal signals;
support PAL/NTSC composite synchronisation timing;
output signals compatible with SCART (PeRI) control lines;
automatic PAL/NTSC.

The software includes vertical and horizontal passing on a TV screen;
intensity and contrast control via software;
a colour depth (nor limited to scan rate converter ADC resolution;
support 16 colour mode for 640×480 resolution (BIOS mode 12);
supports 256 for colour mode for 640×480 resolution (VESA BIOS mode 101);
DOS node support for mode 0 to 13h.

The interface unit is effectively an intelligent TV interface and accepts interlaced RGB data and synchronisation signals with maximum bandwidth of 30hZ and outputs composite synchronisation signal and RGB data.

The interface unit requires vertical and horizontal synchronising signals to generate internal control signals.

The synchronisation polarity is set by the associated software driver to be positive. The TV synchronisation generation circuit is derived from the applied vertical and horizonal VGA synchronisation timing The The interface unit requires one clock signal which is generated by an external crystal or supplied clock input.

According to VGA horizontal and vertical synchronisation timing, input VGA horizontal synchronisation is about 15.625 Khz and vertical synchronisation is 50 Hz or 60 Hz depending on TV system selection. Normally 50Hz is for PAL and 60Hz is for NTSC. This timing is set by the system driver software to values shown in Table 1 below.

|  | H Freq (kHz) | Period (µs) | VFreq (Hz) | Period (ms) |
| --- | --- | --- | --- | --- |
| NTSC | 15665 | 63.84 | 59.68 | 16.76 |
| PAL | 15665 | 63.84 | 50.13 | 19.95 |

It is preferred that the interface unit uses a DOS compatible TCR to intercept BIOS calls for mode changes. Timing values and parameters are adjusted for mode 0 to 13h senses the VGA card and automatically adjusts its operation to suit the installed card.

According to one embodiment the interface unit uses a "Windows" compatible display driver to provide a crisp and sharp display on conventional television screens. It uses a combination of software techniques, designated progressive scan technology (PST ©) and progressive area technology (PAT ©) to reduce flicker dynamically. Since this is a software technique it can be enhanced and modified for future versions of "Windows" without impacting on the hardware.

According to another embodiment of the present invention the interface unit is arranged to be connected with a projector for projecting TV images onto a screen.

We claim:

1. A controller for synchronising video signals for display on a TV screen comprising:

a horizontal input storage means for receiving a horizontal synchronising signal of a first sequence for computer generated image data;

a vertical input storage means for receiving a vertical synchronising signal of a second sequence for computer generated image data;

a first processor means for generating a horizontal synchronizing signals of a third sequence and vertical synchronising signals of a fourth sequence;

and a second processing means for combining the horizontal synchronising signal of the first sequence and the horizontal synchronising signal of the third sequence to generate a horizontal synchronising signal of a fifth sequence and for combining the vertical synchronising signal of the second sequence with the vertical synchronizing signal of the fourth sequence to generate a vertical synchronising signal of a sixth sequence;

wherein the horizontal synchronising signal of the fifth sequence and the vertical synchronising signal of the sixth sequence generated by the second processor means are arranged to provide timing sequences for image data generated by a computer whereby the image data can be displayed on a TV screen.

2. A controller as claimed in claim 1, comprising formatting means for receiving first image data of a first format, processing first image data of a first format, processing first image data into first image data of a second format and outputting the first image data of the second format as second image data.

3. A controller as claimed in claim 2, comprising image data inputs for receipt of first image data and image data outputs for output of second image data; wherein the formatting means is arranged to be connected to the image data inputs and image data outputs.

4. A controller as claimed in claim 2, wherein the formatting means comprises image modulation means which is arranged to process the first image data of the first format into the second image data comprising odd and even frame image data synchronized with the horizontal synchronising signal of the fifth sequence and the vertical synchronising signal of the sixth sequence.

5. A controller as claimed in claim 4, wherein the image modulation means comprises horizontal image modulation means which is arranged to scan first image data in a horizontal direction and vertical image modulation means which is arranged to scan first image data in the vertical direction.

6. A controller as claimed in claim 5, comprising post processing means which is arranged to remove changes in the second image data based on information from the horizontal image modulation means.

7. A controller as claimed in claim 5, wherein the horizontal image modulation means and the vertical image modulation means are arranged to analyse parameters so the first image data and produce the second image data in the second format.

8. A controller as claimed in claim 7, wherein the horizontal image modulation means is arranged to analyse parameters of the image data in two dimensions at predetermined time intervals.

9. A controller as claimed in claim 8, wherein the two dimensional image data parameters used by the horizontal image modulation means include width of image, height of image, colour transition of image and colour of image.

10. A controller as claimed in claim 9, wherein the horizontal image modulation means comprises a horizontal image modulation algorithm having one or more of the following image modulation techniques:
 i. No change;
 ii. Change to colour using CLUT or calculation or both;
 iii. Blend consecutive data;
 iv. Gradient the colour of the image.

11. A controller as claimed in claim 9, wherein the vertical image modulation means is arranged to analyse parameters associated with a change between adjacent first image data in subsequent odd and even lines of frame image data.

12. A controller as claimed in claim 11, wherein the parameters analysed by the vertical image modulation means comprises the number of consecutive lines in odd and even lines of Frame image data with similar colour and colour transitions in consecutive lines.

13. A controller as claimed in claim 12, wherein the vertical image modulation means comprises a vertical image modulation algorithm using one or more of the following modulation techniques;
 i. No change;
 ii. Change line colour using CLUT or calculation or both
 iii. Blend vertical colour transitions;
 iv. Gradient vertical colour transitions.

14. A controller as claimed in claim 9 wherein the horizontal image modulation algorithm can vary from a single colour representation of the first image data to a fully modulation colour representation of the initial image.

15. A controller as claimed in claim 6, wherein the post processing means comprises a post processing routine which when activated restores portions of the first image data to associated portions of the second image data which is subject to undesired changes.

16. A controller as claimed in claim 1, comprising a clock storage means for receiving signals indicative of the clocking rate of computer generated image data for which the horizontal synchronising signal of the fifth sequence and the vertical synchronising signal of the sixth sequence provide timing sequences.

17. A controller as claimed in claim 1, wherein the horizontal synchronising signal of the fifth sequence and the vertical synchronising signal of the sixth sequence are combined by a third processing means which generates a combined synchronising signal for controlling timing of computer generated image data which is to be displayed on an electronic display having different image data timing requirements to that of a computer display.

18. A controller as claimed in claim 1, comprising a fourth processing means for receiving computer generated image data of a first format, modifying the level of received image data signals and outputting image data signals having the modified level.

19. A controller as claimed in claim 16, wherein the clock storage means is arranged to receive a clock signal associated with the image data and the first processing means is arranged to utilise the clock signal received by the clock storage means and to generate horizontal synchronising signals of the third sequence and vertical synchronising signals of the fourth sequence.

20. A controller as claimed in claim 16 wherein the clock storage means is arranged to receive a clock signal associated with the video signal and the second processing means is arranged to utilise the clock signal received by the clock storage means to generate the horizontal synchronising signal of the fifth sequence and the vertical synchronising signal of the sixth sequence.

21. A controller as claimed in claim 19 wherein the first processor means comprises a binary counter which is arranged to receive the clock signal and divide it to provide timing signals for the generation of the horizontal synchronising signal of the third sequence and the vertical synchronising signal of the fourth sequence.

22. A controller as claimed in claim 21, comprising a mode selector which is arranged to determine a timing for the fifth sequence and the sixth sequence so that the controller can be selected to produce timing signals compatible with timing requirements of different electronic displays.

23. A controller as claimed in claim 21, wherein the binary counter is arranged to output signals to a PAL of the second processor means to produce a tessellated horizontal synchronising signal of the fifth sequence and vertical synchronising signal of the sixth sequence for output by the controller.

24. A method of synchronising image data for display on a TV screen, the method comprising the steps of receiving a horizontal synchronising signal of a first sequence associated with computer generated image data receiving a vertical synchronising signal of a second sequence associated with the computer generated image data using a first processor means to generate horizontal synchronising signals of a third sequence and vertical synchronising signals of a fourth sequence using a second processor means for combining the horizontal synchronising signal of the first sequence and the horizontal synchronising signal of the third sequence and for combining the vertical synchronising signal of the second sequence with the vertical synchronising signal of the fourth sequence to generate horizontal synchronising signals of a fifth sequence and vertical synchronising signals of a sixth sequence respectively and outputting the horizontal synchronising signals of the fifth sequence and vertical synchronising signals of the sixth sequence to provide timing sequences for computer generated image data whereby the image data can be displayed on an electronic display.

25. A method as claimed in claim 24 including the step of combining the horizontal synchronising signal of the fifth sequence and the vertical synchronising signal of the sixth sequence using a third processing means to generate a combined synchronising signal for controlling timing of the image data.

26. A method as claimed in claim 24, including the step of using a formatting means to receive first image data of a first format, processing first image data into second image data comprising first image data of the second format and generating the second image data whereby the horizontal synchronising signal of the fifth sequence and the vertical synchronising signal of the sixth sequence can provide timing sequences for the second image data.

27. A method as claimed in claim 26 including the step of using the formatting means to process the first image data of the first format into the second image data whereby the second image data comprises odd and even frame image data synchronized with the horizontal synchronising signal of the fifth sequence and the vertical synchronising signal of the sixth sequence.

28. A method as claimed in claim 27 wherein the method steps are carried out by a controller as claimed in any one of claims 1 to 21.

29. An interface unit for interfacing a VGA controller and a TV screen, the interface unit having inputs which are connected with horizontal and vertical synchronising signals generated by the VGA controller and image data generated by the VGA controller, and which has outputs connected to the driver of the TV screen, whereby in use image data transmitted by the VGA controller to the interface unit is arranged to be reformatted and synchronized to timing requirements of the TV screen driver with which the interface unit is connected, whereby image data transmitted by the VGA controller can be displayed on a TV screen.

30. A system as claimed in claim 29, wherein the interface unit comprises a controller as claimed in any one of claims 1 to 21.

* * * * *